UNITED STATES PATENT OFFICE.

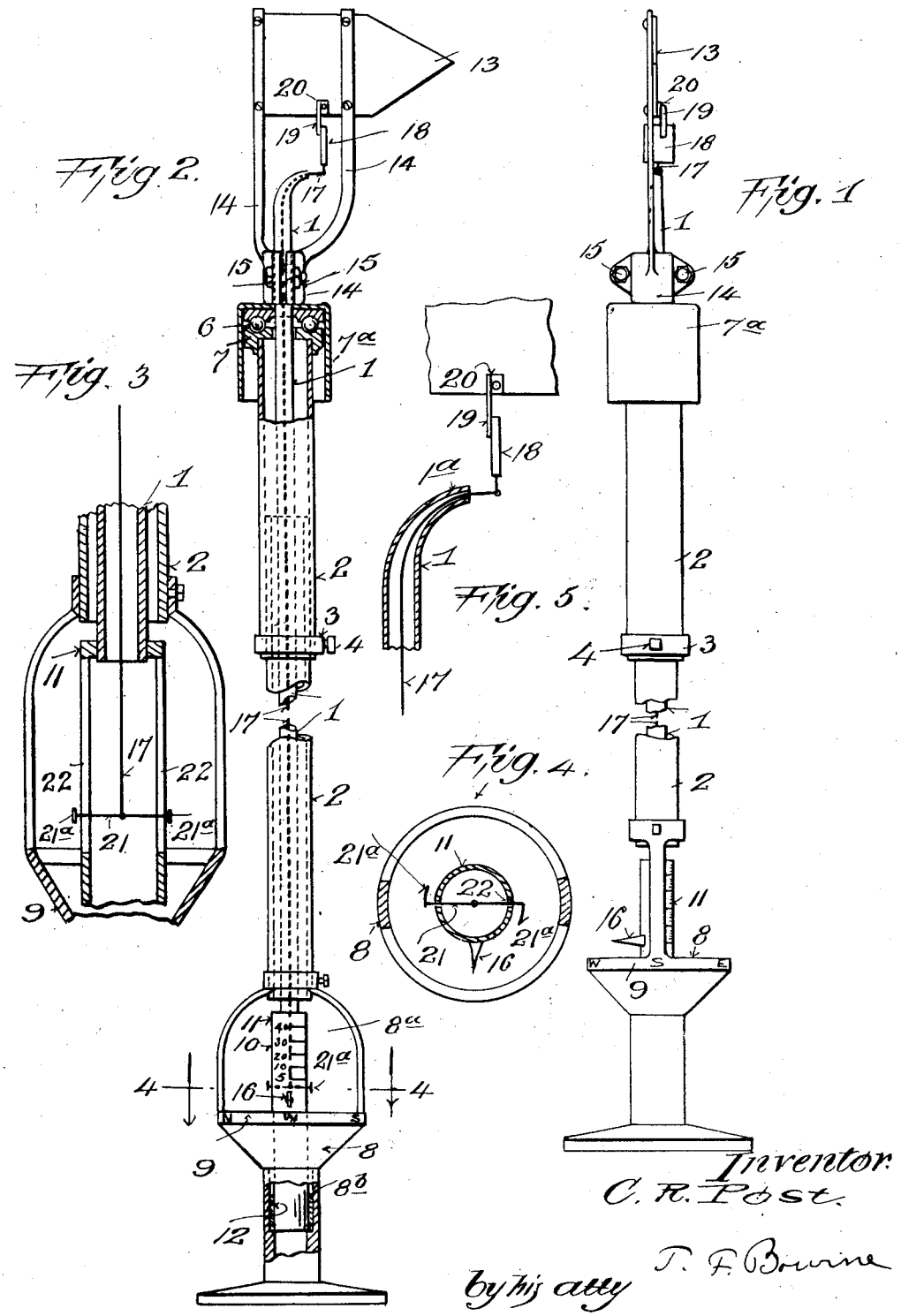

CHARLES RUSSELL POST, OF NEW YORK, N. Y.

WIND-INDICATOR.

1,344,315.  Specification of Letters Patent.  Patented June 22, 1920.

Application filed October 11, 1919. Serial No. 330,043.

*To all whom it may concern:*

Be it known that I, CHARLES R. POST, a citizen of the United States, and resident of New York city, in the county of New York and State of New York, have invented certain new and useful Improvements in Wind-Indicators, of which the following is a specification.

The object of my invention is to provide simple and efficient means for indicating the direction and speed of the wind to be observed at a distance from members operated by the wind, whereby the wind indicator may be located within a building and its operating members located exterior thereto.

My invention comprises novel details of improvement and combinations of parts that will be more fully hereinafter set forth and then pointed out in the claims.

Reference is had to the accompanying drawings forming a part hereof wherein—

Figure 1 is a side view of my improvements;

Fig. 2 is a partly sectional side view at right angles to Fig. 1;

Fig. 3 in an enlarged vertical detail section;

Fig. 4 is a section on the line 4—4 in Fig. 2; and

Fig. 5 is an enlarged detail section.

Similar numerals of reference indicate corresponding parts in the several views.

The numeral 1 indicates a tube which may extend vertically from a roof of a building inwardly to any desired level therein, such as to the lower floor, which tube may be journaled to rotate upon its longitudinal axis by any suitable means. I have shown an inclosing tube or casing 2 for tube 1. The tube 1 and casing 2 may each comprise any required lengths of tubing secured together end to end in any suitable manner to provide the length of tube and casing required for installation of my invention at a particular location. For convenience of manufacture I have shown tube 2 comprising two telescopic tubes which may be attached together by a ring band 3 and screws 4. Tube 1 is shown provided with a ball race 5 resting upon anti-friction balls 6 supported by a race 7 secured at the upper end of tube 2, whereby tube 1 depends from such anti-friction bearing for freedom of rotation within the outer casing or tube. A cap-like shield 7$^a$ is shown inclosing said bearing and the upper end of tube 2 to protect against entrance of water. The lower end of the casing or tube 2 is shown connected to a frame 8 which is open at 8$^a$ and is provided with an annular rim portion upon which may be produced designations or a scale 9 for indicating the points of the compass, such as N, W, S, E. The tube 1 at its lower end is provided with an indicator shown as a scale comprising vertically disposed graduations shown at 10, to indicate the speed of the wind, and as a convenient means I provide an enlarged tube section 11 secured to the lower end of tube 1 and carrying the scale 10. Since the tube 1 may be made relatively small the tube 11 may be made relatively large to provide sufficiently large numerals of indication for ready observation. The lower end of tube 11 is shown guided in a bore 8$^b$ of the pedestal portion of frame 8, and by preference a washer of felt or the like, indicated at 12, is located in said bore surrounding the tube 11 and serves to permit free and quick rotation of the latter. At 13 is indicated a weather vane which may be of any suitable construction, and the same is shown carried by a suitable support or frame 14 attached to tube 1 near its upper end. I have shown two members of frame 14 having flanges receiving tube 1 and secured together by bolts 15, whereby the frame is readily clamped upon the tube in proper relation to the pointer 16, that is, so that the pointer 16 projecting from tube 11 coöperates with indications 9 of the points of the compass before mentioned. Extending longitudinally within the tube 1 is a flexible connection such as a wire 17 the upper end of which is attached to a movable member 18 shown in the form of a flat plate having sufficient area to be influenced by the flow of air thereagainst and shown extending at right angles to the vane 13. While the member 18 may be attached to any convenient part rotative with the vane, I have shown said member attached to vane 13 by means of a relatively light spring 19 secured to said vane, as at 20, by screws, pins or the like, whereby said member 18 will tend to return to normal inactive position. The upper end of tube 1 is shown provided with an outlet portion 1$^a$ extending in a direction laterally with respect to the axis of tube 1 for passage of the wire 17, whereby the latter is guided with respect to member 18. The lower end of the wire 17, for operation within the tube member 11, is provided with one or more pointers shown in the form of a transverse wire 21 extending through vertical slots 22 on opposite sides of tube member 1, the outer ends of said wire 21 being suitably shaped or bent at 21ª to act in the nature of pointers in connection with the scale 10 on tube member 11. Instead of having two slots 22 and two scales 10 on opposite sides of tube member 11 with two pointers 21ª the same may be provided with a single scale, slot and pointer if preferred, but by having two of the same the scale may be read from opposite sides.

In accordance with my improvements the indicator may be installed in a building in any desired manner so that the tube 2 passes through the roof of the building and may be secured thereto watertight by any suitable means, the vane 13 and member 18 being above the building, the scale and indicators being at a lower position within the building for observation. When the wind blows the vane 13 will be operated in ordinary manner and the tube 1 will be rotated so that its pointer 16 will operate in connection with the indicator 9 to indicate the direction of the wind and the member 18 will be swung to one side proportionately to the speed of the wind whereby the wires 17 will be drawn upwardly within tube 1 a distance corresponding to the movement of member 18. When the wire is thus drawn the indicator 21 will be correspondingly moved along the scale 10 to indicate thereon the speed of the wind, as in miles. As the speed of the wind decreases the member 18 will return toward normal and the indicator 21 will be lowered correspondingly and so on.

My improvements afford a simple, cheap and effective means that may be located in a convenient position to indicate the direction and speed of the wind without requiring the observer to go outside of a building to observe the vane and where the reading of the indicator or scale can be taken at night and in foggy weather in a direct and convenient manner.

Having thus described my invention, what I claim and desire to secure by Letters Patent is:—

1. A wind indicator comprising a vane, a tube connected therewith, a pointer and a scale carried by and rotative with the tube, an indicator for the pointer to indicate the direction of the wind, a member supported to rotate with the vane and movable by the wind separately thereof, and a pointer operatively connected with said member and rotative by and with said tube to operate with the scale to indicate the speed of the wind.

2. A wind indicator comprising a vane, a tube connected therewith, a pointer and a scale carried by and rotative with the tube, an indicator for the pointer located around the tube to indicate the direction of the wind, a member supported to rotate with the vane and movable by the wind separately thereof, a pointer movable along said scale and rotative by and with said tube and a wire connected with said member and with said pointer to operate the latter with the scale to indicate the speed of the wind.

3. A wind indicator comprising a vane, a tube connected therewith and provided with a pointer and a scale, an indicator for the pointer to indicate the direction of the wind, said tube having a slot, a pointer for said scale extending through said slot, a member supported to rotate with the vane, and a wire extending from said member within said tube and connected to said pointer.

4. A wind indicator comprising a vane, a tube connected to and depending below said vane and provided with a scale and a slot below the vane, a bearing rotatively supporting said tube and vane, a member movably supported to rotate with the vane and movable by the wind separately thereof, a wire connected to said member and extending within said tube, and a pointer connected with said wire and extending through said slot to coöperate with said scale to indicate the speed of the wind.

5. A wind indicator comprising a vane, a tube connected to and depending below said vane and provided with a scale and a slot below the vane, a casing receiving said tube and having a bearing rotatively supporting the tube, a frame at the lower part of the casing having an indicator to indicate the direction of the wind, said tube having a pointer for said indicator, a member movably supported to rotate with the vane and movable laterally by the force of the wind, a wire connected with said member and extending within said tube, and a pointer connected with the wire and operative in said slot to indicate the speed of the wind on said scale.

Signed at New York, in the county of New York and State of New York, this 10th day of October, A. D. 1919.

CHARLES RUSSELL POST.